Jan. 21, 1941.  B. A. SUTTER  2,229,228
HYDRAULIC COUPLING
Filed Aug. 11, 1939  2 Sheets-Sheet 1
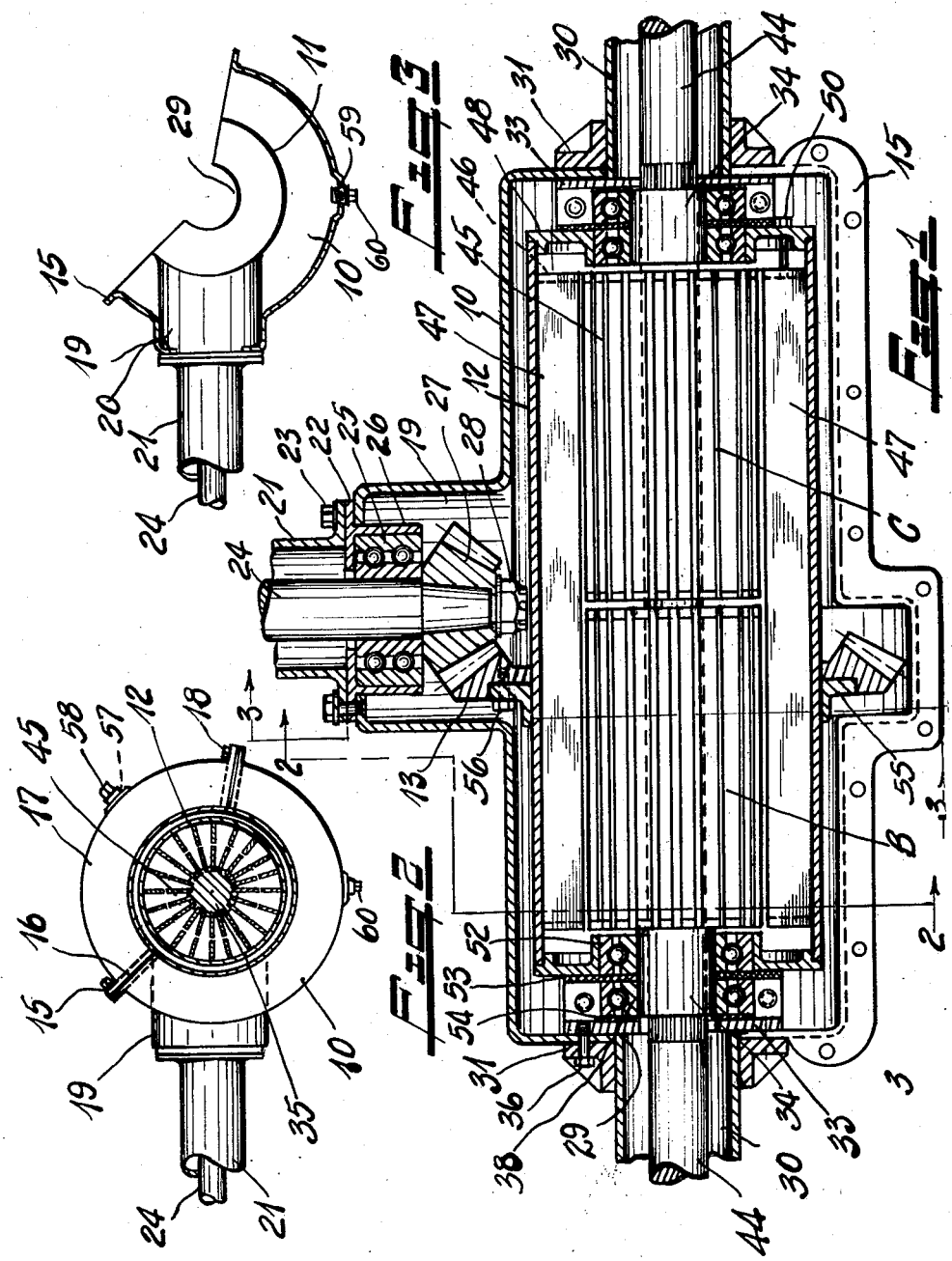
INVENTOR
Bernard A. Sutter.
BY
Frank C. Searman
ATTORNEY Jan. 21, 1941.  B. A. SUTTER  2,229,228
HYDRAULIC COUPLING
Filed Aug. 11, 1939  2 Sheets-Sheet 2
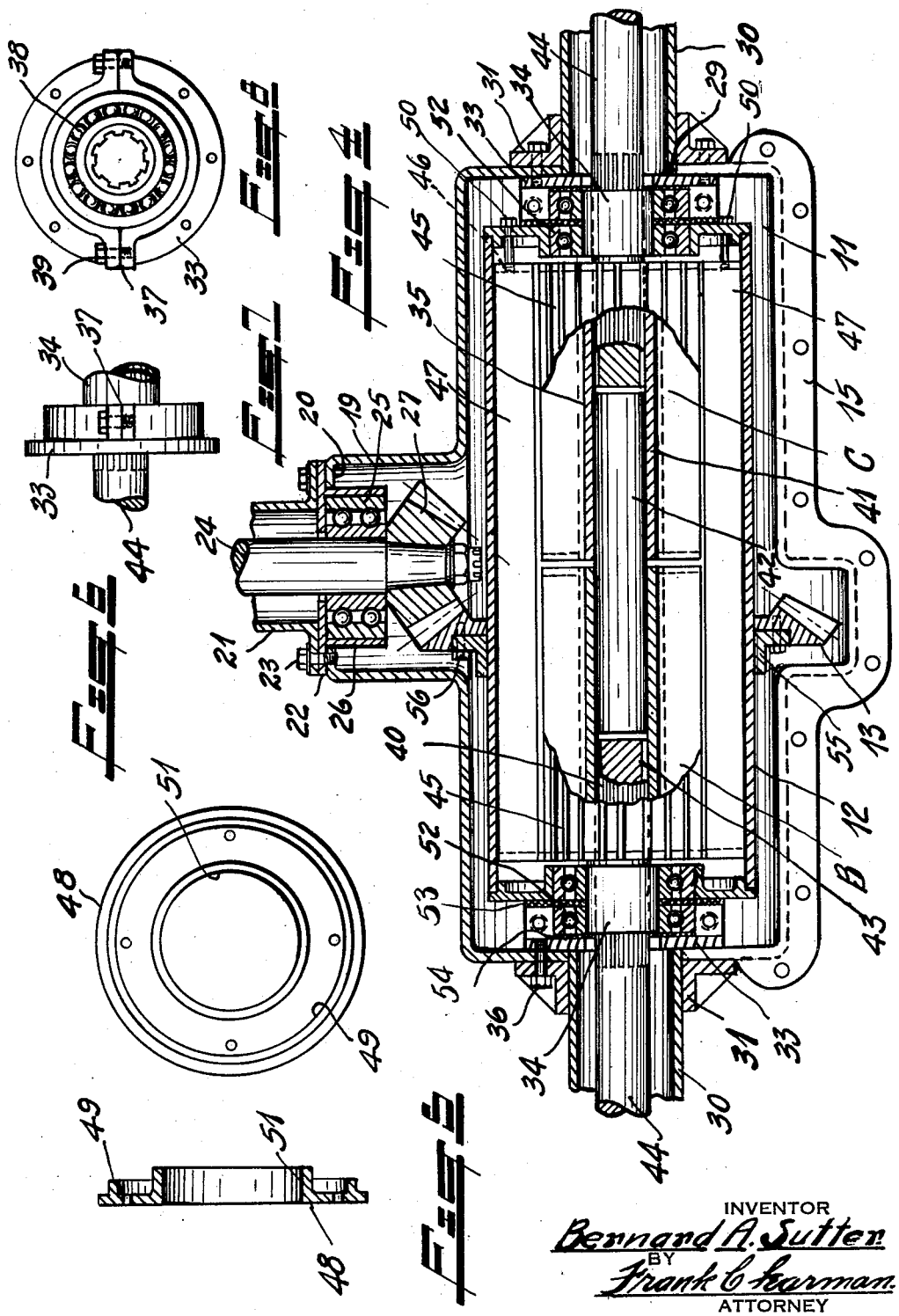
INVENTOR
Bernard A. Sutter
BY
Frank C. Karman
ATTORNEY Patented Jan. 21, 1941

2,229,228

UNITED STATES PATENT OFFICE 2,229,228

HYDRAULIC COUPLING

Bernard A. Sutter, Corunna, Mich.

Application August 11, 1939, Serial No. 289,576

4 Claims. (Cl. 74—389.5)

The present invention relates to couplings of the hydraulic design, and more particularly to a hydraulic differential for use in the rear axle of automotive vehicles in general for transmitting power from the vehicle drive shaft to the axle shaft.

One of the prime objects of the invention is to provide a hydraulic rear axle drive of substantial, practical and efficient design, which can be readily assembled and/or disassembled, and which is smooth and velvety in operation.

Another object is to provide a hydraulic differential mechanism, so constructed and designed that the axle shaft can be readily removed endwise from the axle housing after which the entire vane assembly can be lifted out of the axle housing as a unit for repair, adjustment or any other purpose.

A further object is to provide a very practical hydraulic differential unit composed of few parts, all of sturdy construction, which can be readily and economically manufactured, and which will be extremely efficient in operation.

A still further object is to design a hydraulic unit in which the vanes are easily insertable or removable, and which is so balanced that it imposes a minimum of strain and wear on the drive shaft, motor, and associated parts.

With the above and other objects in view, the present invention consists in the combination and arrangement of parts hereinafter more fully described, illustrated in the accompanying drawings, and more particularly pointed out in the appended claims, it being understood that changes may be made in the form, size and minor details of construction, without departing from the spirit, or sacrificing any of the advantages of the invention.

In the drawings:

Fig. 1 is a fragmentary part sectional plan view of the rear axle of an automotive vehicle and embodying my invention.

Fig. 2 is a transverse sectional end view taken on the line 2—2 of Fig. 1.

Fig. 3 is a view similar to Fig. 2 and taken on the line 3—3 of Fig. 1, and showing only the casing with the cover removed.

Fig. 4 is also a transverse sectional view similar to Fig. 1, parts being broken away to show the construction.

Fig. 5 is a side elevational view of one of the drum end plates.

Fig. 6 is an end view thereof.

Fig. 7 is a fragmentary side elevational view of the split bearing assembly.

Fig. 8 is a part sectional end view of the assembly shown in Fig. 7.

Referring now more particularly to the drawings in which I have shown the preferred embodiment of my invention, the numeral 10 indicates a conventional axle housing preferably, but not necessarily, pressed from sheet metal, the center section 11 being of a size to accommodate the cylindrical vane drum 12, and the bevel gear 13 which is mounted thereon. The section 11 is open as shown in Fig. 3 of the drawings and is surrounded by a flange 15 on which a gasket 16 is mounted, said opening being of a size to facilitate the removal of the vane drum and associated parts as a unit, and a cover 17 forms a closure for said opening and is secured in position by means of bolts 18 as usual, the gasket 16 forming a tight leakproof joint thereat.

A forwardly extending cylindrical neck 19 is formed integral with the section 11, the end being flanged as at 20, and the end of the drive shaft tube 21 is secured thereto, a cylindrical bearing support 22 being interposed between the neck and tube, and bolts 23 serve to secure the parts in assembled relation.

The drive shaft 24 is mounted in the tube 21 and projects into the neck 19, and a bearing 25 is mounted in the cylindrical neck portion 26 of said support and in which the drive shaft 24 is journaled, centrally disposed openings being provided in said support and flanged ends to accommodate said shaft. A bevel gear 27 is mounted on the end of the drive shaft 24 as shown, said gear meshing with and driving the gear 13 which is mounted on the vaned drum or cylinder 12, the end of the drive shaft being threaded to receive a nut 28 as usual.

Openings 29 are provided in the ends of the enlarged housing section 11 and accommodate the inner ends of the tubular axle sleeves 30 as shown, a flanged collar 31 being welded on each sleeve directly adjacent the inner end thereof, and a combination disk and bearing support 33 is mounted in said section in facial contact with the end wall of the housing and is suitably bored to accommodate the shouldered end 34 of the vaned shaft 35, bolts 36 extending through the flanged collar and bearing support to form a rigid connection and structure. The bearing support 33 is horizontally split as at 37, and a bearing 38 is mounted therein, bolts 39 securing the upper section of the bearing support in position.

The vaned shaft 35 is formed as clearly shown in Fig. 4 of the drawings, and is formed in two sections B and C respectively, each section being internally bored and broached for a predetermined distance as at 40, the abutting ends of the sections having an enlarged bore 41 to accommodate a short shaft section 42 so that the sections B and C may turn or rotate with relation to each other to permit proper differential as necessary when turning corners, etc. The inner ends 43 of the axle shafts 44 are splined as shown and are fitted to engage the broached ends 40 of the vaned shaft.

Radiating vanes or blades 45 are mounted on the splined exterior of the shaft sections B and C and can be rigidly secured in position by welding or in any other desired manner.

The vaned drum 12 surrounds the members B and C and is provided with rings 46 directly adjacent the ends thereof, and a plurality of blades or vanes 47 are mounted in said rings on the interior of the drum in spaced apart relation and can be further secured in position by welding or in any other approved manner, the drum extending slightly beyond the ends of the blades and an end plate 48 is fitted thereto, (see Figs. 5 and 6 of the drawings) an inwardly extending flange 49 being provided on said end plate as shown and bolts 50 serve to secure it in position. A centrally disposed flanged opening 51 is provided in each end plate and accommodates an anti-friction bearing 52, which bearing is in turn mounted on the shouldered end 34 of the shaft sections B and C. A sealing ring 53 is interposed between the bearings 38 and 52, and a similar sealing ring 54 is interposed between the bearing 52 and the flanged end of the housing 11.

A flanged ring 55 is welded to the exterior of the drum 12 at a point intermediate its length and the bevel ring gear 13 is secured thereto by means of bolts 56, said gear meshing with and being driven from the gear 27 which is mounted on the drive shaft 24.

Wheels (not shown) are, of course, provided on the outer ends of the axle shafts 44 and include bearings (not shown) as usual; however, this forms no part of the present invention which is broadly directed to the hydraulic drive.

Lubricant or other liquid is introduced to the drum through openings 57, and a plug 58 forms a closure therefor, a similar plug 59 being provided in the housing for drainage when desired, and a plug 60 is provided in the cover to facilitate the insertion of grease, said cover being so shaped that but little drainage is necessary when it is desired to repair or otherwise inspect the driving unit.

For the purpose of repair the cover 17 is first removed, the shafts 44 are then drawn endwise from the differential, until they clear the end of the axle tube, the bolts 39 are next unscrewed and the upper half of the split bearing 38 removed, and the entire drum, vaned shaft, etc. can then be removed as a single unit and can be placed on a bench where it can be readily disassembled, repaired and/or parts replaced. Assembly is accomplished in exactly the same manner, the steps being merely reversed. The bearings 38 and 52 accurately align the axle shafts, vaned axles, and vaned drum, and all parts are readily accessible for tightening, repair, or adjustment.

It will, of course, be obvious that the ratio or size of shaft vanes and drum vanes can be varied to suit the power it is desired to convey, and that the axle housing can be formed in one single piece if desired.

From the foregoing description, it will be obvious that I have perfect a very simple, practical and economical hydraulic differential for motor vehicles or other machines of a similar nature.

What I claim is:

1. A hydraulic differential for automotive vehicles comprising a leakproof axle housing, a sectional vaned shaft journaled therein, a drum surrounding the sectional shaft having a plurality of vanes on the interior thereof, end plates forming a closure for the ends of said drum and journaled on said vaned shaft, a gear on said drum and drivingly connected to the drive shaft of the vehicle, axle shafts drivingly connected to the vaned shafts, means for admitting liquid to the drum, and a cover on the housing and of a size sufficient to permit removal of the drum and vaned shaft assembly as a unit when the axle shafts have been disconnected.

2. A hydraulic differential for automotive vehicles comprising a leakproof axle housing formed with an enlarged center section, bearings removably mounted in the end walls of said center section, a sectional vaned shaft journaled in said bearing, said sections being mounted end to end and rotatable with relation to each other, a vaned drum surrounding the vaned shafts and journaled thereon, axle shafts connected to said vaned shafts and disconnectable endwise therefrom, and means for drivingly connecting said drum to a source of power, and a removable cover on said housing and of a size to permit the removal of the drum and vaned shaft assembly as a unit.

3. A hydraulic differential for automotive vehicles comprising a leakproof axle housing formed with an enlarged center section, a sectional vaned shaft journaled in said center section with the vaned sections disposed in abutting relation and rotatable with relation to each other, a vaned drum surrounding said vaned shaft and journaled thereon, said drum forming a liquid reservoir, axle shafts drivingly connected to said vaned shaft, said drum and vaned shaft being removable as a unit after the axle shafts have been disconnected, and means for drivingly connecting said drum to the drive shaft of the vehicle.

4. A hydraulic differential for automotive vehicles comprising a leakproof housing provided with an enlarged center section, a removable cover, a two-part vaned shaft journaled in said section with the parts disposed in end to end relation and rotatable with relation to each other, a cylindrical drum surrounding said vaned shaft and provided with a plurality of vanes on the interior thereof, end plates forming a closure for said drum and journaled on the vaned shafts, said drum forming a liquid reservoir, splined shafts drivingly connected to ends of the vaned shaft and disconnectable and removable endwise therefrom, sectional bearing supports in said center section to permit removal of the vaned shaft and drum as a unit when the axle shafts have been disconnected, and a gear securely mounted on the drum and drivingly connected to the drive shaft of the vehicle.

BERNARD A. SUTTER.